Jan. 26, 1954

R. M. HENDERSON 2,667,041

EVAPORATOR AND DRIP CATCHER ARRANGEMENT
FOR REFRIGERATING APPARATUS

Filed Oct. 27, 1948

INVENTOR.
Ray M. Henderson
BY
Lamphere and Van Valkenburgh
ATTORNEYS

Jan. 26, 1954

R. M. HENDERSON 2,667,041

EVAPORATOR AND DRIP CATCHER ARRANGEMENT
FOR REFRIGERATING APPARATUS

Filed Oct. 27, 1948

*INVENTOR.*
Ray M. Henderson

BY
*Lamphere and Van Valkenburgh*
ATTORNEYS

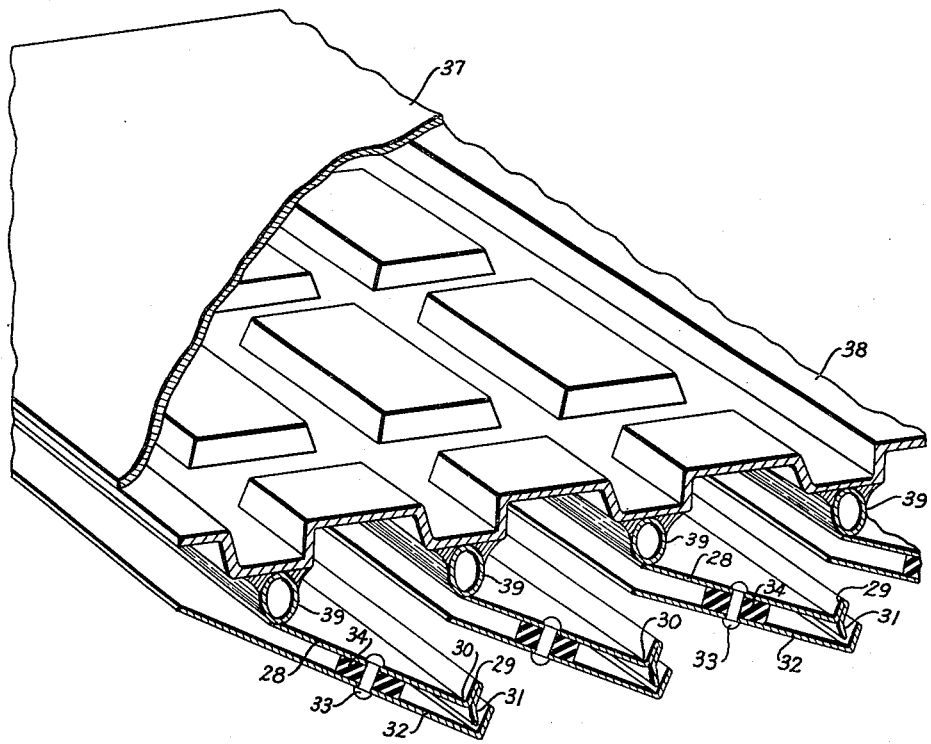
FIG.—7
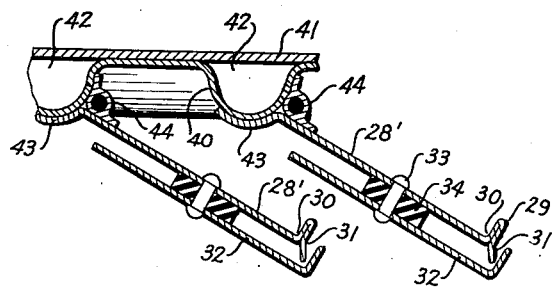
FIG.—8

Patented Jan. 26, 1954

2,667,041

UNITED STATES PATENT OFFICE 2,667,041

EVAPORATOR AND DRIP CATCHER ARRANGEMENT FOR REFRIGERATING APPARATUS

Ray M. Henderson, Bryan, Ohio

Application October 27, 1948, Serial No. 56,818

17 Claims. (Cl. 62—103)

This invention relates to refrigerating apparatus and more particularly to the evaporator or heat absorbing unit or coils of a refrigerating system employed in absorbing heat.

One of the objects of the invention is to produce an improved evaporator for refrigerating systems for cabinets and cold storage rooms, especially those used for storing or freezing food products.

Another object is to produce an improved unitary evaporator and drip catcher or drip collecting means which will absorb heat and also catch and convey water dripping from the evaporator during the heat absorption process.

Still another object of the invention is to so construct an evaporator and so associate therewith in heat exchange relation a drip catcher that both the evaporator and drip catcher can be quickly and efficiently defrosted by injecting heat into the evaporator.

A further object is to produce an evaporator for a refrigerating system which will have both primary and secondary heat absorbing surfaces, the latter of which is so constructed and associated with the former as to provide means for catching and collecting water dripped from the evaporator.

Yet a further object is to associate with the evaporator coils of a refrigerating system, heat absorbing fins that are so constructed and related to each other that a drip catcher will be provided for the coils in heat exchange relation therewith.

Yet another object is to produce an evaporator and drip catcher means which produces a maximum amount of heat absorbing surface, together with a minimum amount of occupied space, thus permitting a reduction in the necessary height of a refrigerator room and also savings in shipping.

A still further object is to produce a refrigerating system evaporator and drip catcher means which is highly efficient, compact, easy and cheap to manufacture, light in weight and readily installed at a low cost.

Other objects of the invention will become apparent from the following description taken in connection with the accompanying drawing in which:

Figure 7 is a perspective view, partly in section, showing the drip catcher embodying the invention combined with a multiple path plate type of evaporator and also having associated therewith heat conducting tubes for defrosting purposes; and Figure 8 is a sectional view showing my improved drip catcher combined with a serpentine type of plate evaporator.

Figure 1:
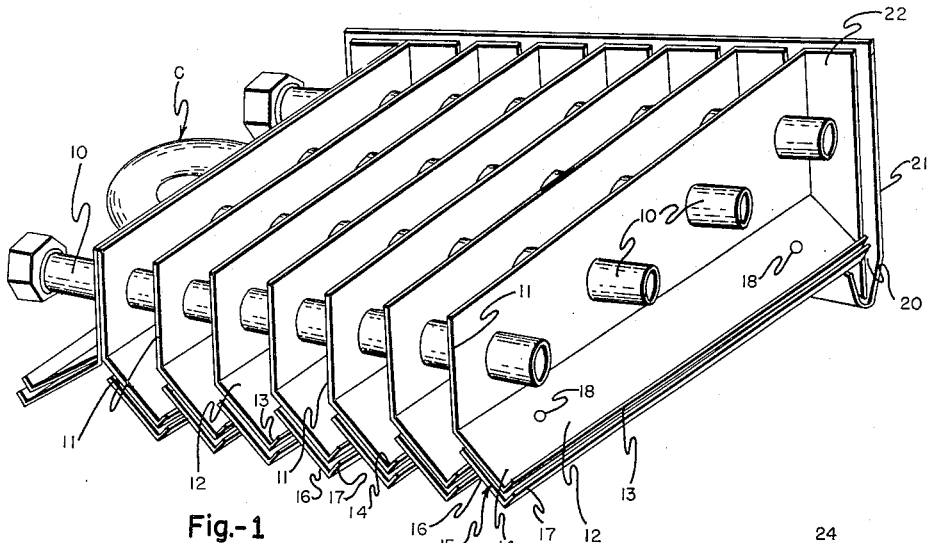
Figure 1 is a perspective view of a portion of an evaporator for a refrigerating system embodying my invention and showing drip catcher means combined with the heat absorbing fins.
Figure 2:
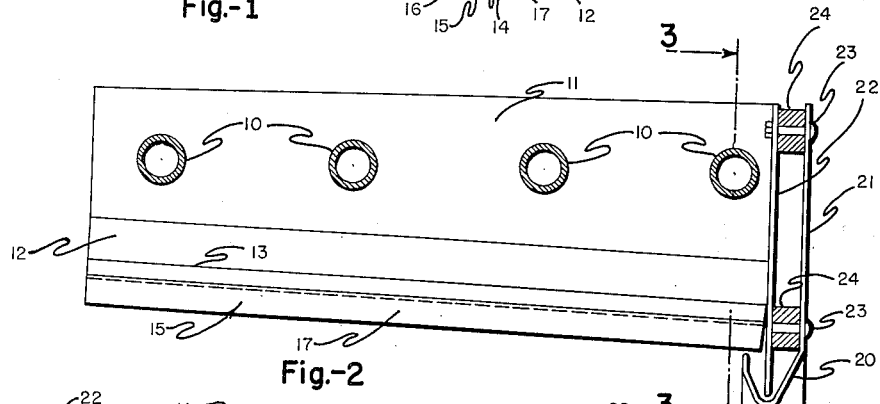
Figure 2 is a side view of the evaporator of Figure 1.
Figure 3:
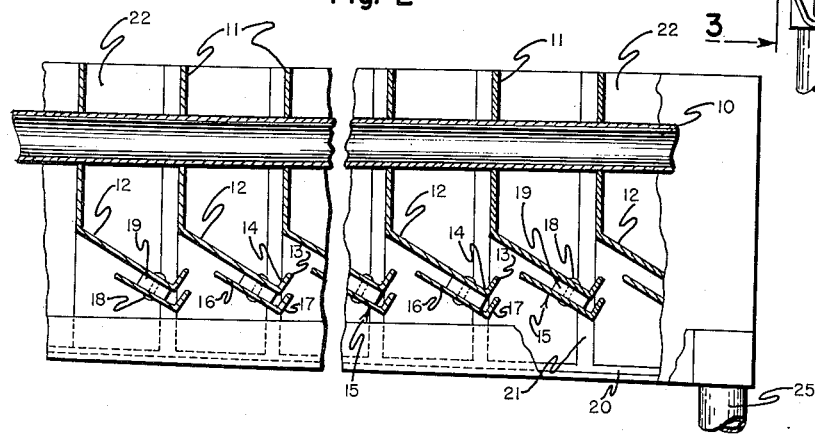
Figure 3 is a view showing details of construction, said view being partly sectional and partly fragmentary with the sectional view being taken approximately on the line 3—3 of Figure 2.

Referring to the drawings in detail and first to the evaporator structure shown in Figures 1, 2 and 3, there is disclosed a pipe structure 10 bent back and forth upon itself to provide an evaporator in the form of a coil C. This coil is connected into the refrigerating system in the usual manner, which system will include a compressor, a condenser, a receiver and means for controlling the flow of the refrigerant, said structure not being shown since it is well known. The coil acts as a refrigerant expansion chamber and absorbs heat from the air, thus providing for the cooling thereof. Associated with the coil is a plurality of plate fins 11 mounted on the pipe at right angles to the axes of the parallel pipe portions and through which the pipe passes. The lower portion of each fin is provided with an integral downwardly inclined extension 12. The lower edge part of the inclined portion 12 is upturned, as indicated at 13, thus providing a trough 14. The fins 11 are so spaced apart with respect to each other and the widths of the inclined portions are such that the inclined portion of one fin will extend beneath and thus overlap in a vertical relation an adjacent fin, thereby providing a louver-like assembly. The overlapping relation as shown will be referred to as "vertical overlapping relation." Each fin and the inclined portion, together with the upwardly extending portion 13 forming the trough, is made from a single sheet of good heat conducting material. The inclined portions 12 of each fin extend from a like side and thus there is provided collecting means on the fins for catching water which collects and drips from the fins. Any moisture coming from the fin on the side of the inclined surface will flow into the trough associated with that fin and any moisture coming from the other side of the fin, which can be termed the back side, will drip off into the trough associated with the next rear adjacent fin, that is, the trough which is beneath the fin from which moisture drips.

Each inclined portion 12 of a fin and its trough have associated therewith baffle troughs 15. The baffle troughs are each made from a plate 16 having an upturned marginal portion 17. The baffle trough is positioned below the inclined portion 12 and in spaced relation thereto. The attachment of the baffle trough is made by riveting it to the inclined portion 12, as indicated at 18 in Figure 3. The spacing is accomplished by blocks 19 associated with the rivet, said blocks being preferably of a suitable insulating material such as, for example, wood or rubber.

The space between each baffle trough and inclined portion on a fin prevents any direct heat exchange between these two members. The baffle troughs serve the purpose of preventing rising warm air coming from below the evaporator from making direct contact with the fins and also the inclined portions 12, thus preventing or minimizing condensation of moisture from the warm air on these surfaces. The baffle troughs also catch any dripping of moisture from the undersurfaces of the inclined portions or the turned up edges 13 thereof. The material of the baffle troughs remains quite close to the temperature of the air that comes in contact with them and, therefore, very little moisture will be caused to condense on the surfaces of the baffle trough, particularly the underneath surface thereof.

The inclined surface 12 of each fin is so associated with the fin that the trough 14 formed at the bottom of the inclined surface will be inclined toward one end of the fin, thus any water collecting in the troughs 14 will run toward one side of the evaporator. Since the baffle troughs are connected to the inclined portions 12, they also will slope with the inclined portions and thus any water collecting in their troughs will run toward the same side of the evaporator. Associated with the lower ends of the troughs is a collecting drain-off trough 20 into which water can run from all of the troughs of the fins and the baffle troughs. This drain-off trough 20 is formed at the lower end of a plate 21 which is arranged to be connected to right angle extension plates 22 at the ends of the fins. The plate 21 carrying the trough 20 is arranged to be spaced from the extension plates 22 and the attachment is made by rivets or bolts 23, with which are associated spacer insulating blocks 24. The extension plates extend downwardly into the trough 20 to a point closely adjacent the bottom of the trough. The trough 20 is arranged to drain into any carry-off pipe 25 whereby the moisture can be conveyed to any suitable general drain pipe. The trough 20 will be suitably sloped so that water entering the trough 20 can flow into the pipe 25. It will be noted that each extension plate 22 is slightly spaced from the ends of the troughs 14 and the baffle troughs so that no interference will be present to water running from the ends of these troughs into the drain-off trough 20. It will be noted that each fin 11, its inclined portion 12, the upturned portion 13 forming the trough 14 and the extension plate 22 can all be formed from a single sheet of material and the disclosed structure produced by suitably cutting and forming the single sheet of material.

With a combined evaporator and drip catching means constructed as shown and wherein the drip troughs 14 are formed as an integral extension of the heat absorbing fins and the fins and inclined portions are so associated with each other that a louver-like assembly will result, it will be seen that moisture collecting on the fins and running off will flow into the troughs 14 and from there into the collecting drain-off trough 20 at the side of the evaporator. No moisture can drip from the evaporator onto the floor of the refrigerator room or cabinet in which the evaporator is placed. The baffle troughs being spaced from the drop troughs (thus providing air insulation) will prevent any warm air from coming directly into contact with the inclined portions of the fins and thus reduce moisture collection on the evaporator to a minimum. Any moisture, however, which may collect on the back side of the fin or on the underside of the inclined portion 12 will drip into the baffle troughs and be conveyed into the collecting drain-off trough 20. It will be noted that this collecting drain-off trough is so connected and spaced from the fins that there will be no direct heat absorption from the trough to the fins which would tend to cause excessive moisture in the air to condense or freeze on the outside of the trough. In other words, the trough will be maintained at substantially the same temperature as the surrounding air.

By having the drip troughs 14 as a part of the heat absorbing fins of the coil, a very compact structure will result. In prior practice the drip troughs are a separate unit and are spaced below the fins, thus increasing the over-all dimensions of the evaporator and drip catcher structure. Another great advantage in forming the drip catcher or trough as a part of the fin is that the drip catcher can be defrosted at the same time that the operator and fins are defrosted because of the heat exchange relation therebetween. In accomplishing defrosting of the evaporator, it is general practice to circulate hot refrigerant gases through the coil C in order to make a rapid defrosting, thus not appreciably lowering the temperature of the room or cabinet in which the evaporator is placed. When these hot gases are circulated through the coil, the fins along with the coil will be defrosted, due to the heat conducting property of the material of the fins. Also, the inclined portion 12 and the upturned portion 13 will be defrosted simultaneously since they are integral with the heat absorbing fins and heat received by the fins will be immediately transferred to the inclined portions because of heat exchange relation and the upturned portions. Thus, it will be seen that in defrosting the evaporator there will also be a defrosting of the drip catcher and the defrosting of the drip catcher will take place rapidly. When drip catchers separate from the fins are used with the evaporator coils and such drip catchers are a different unit spaced below the coil and fins, there will be very little defrosting of the drip catcher when the coil is rapidly defrosted since there is no direct heat transfer path between the drip catcher and the fins of the evaporator. In other words, such a separate drip catcher does not have heat exchange relation with the coils or other type of evaporator.

Figure 4:
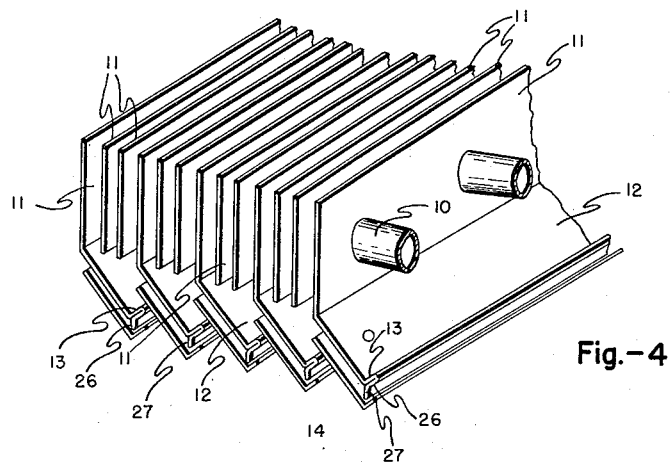
Figure 4 is a view showing a slightly modified evaporator and drip catcher structure.

Another important feature of the structure, wherein the drip catcher is formed as an integral part of the fins, is that there will be provided a secondary heat absorbing area which will increase the efficiency of the evaporator. Heat cannot only be absorbed by the coil and the fins, but will also be absorbed by the inclined portions 12 and upturned portions 13 of the drip catcher as these portions are integral with the fins.

Where an evaporator and drip catcher combination of the kind described is employed in a freezing room, that is, a room in which it is desired to maintain the temperature below freezing, such as locker rooms, frost and ice is very likely to collect on all parts of the evaporator, including the water conveying troughs, that is, both the drip troughs 14 formed as part of the fins and the baffle troughs 15. Under such conditions it might be difficult to obtain an adequate defrosting and unfreezing of ice in the baffle troughs when the evaporator is quickly defrosted. In order to insure that the baffle troughs may have ice or frost removed therefrom during the rapid defrosting of the evaporator by the use of hot refrigerant gases circulated in the coil, a structure can be provided, as shown in Figure 4, whereby this can be accomplished. The upturned portion 15 on the marginal portion of the inclined portion 12, which forms the trough 14, is provided with an extending portion 26 which is bent back upon the upturned portion 15 and then downwardly from the apex of the trough to thus provide a portion 27 extending into the trough part of the baffle trough structure and to a point closely adjacent the bottom of said trough. With this arrangement it will be apparent that when defrosting takes place, by the circulation of hot refrigerant gases, there is a good heat conducting path from the coil into the trough of the baffle trough and closely adjacent its bottom. The heat transferred into the trough will thus melt any frost or ice which has collected in the bottom of the baffle trough or on its surfaces. The same action will take place by the extension plate 22 at the end of each fin, since it is noted that this plate extends to a point closely adjacent the bottom of the collecting drain-off trough 20 at the end of the fins. In addition to the fins 11, which are provided with the drip catcher troughs, there can be additional fins 11' positioned in between the fins, as clearly shown in Figure 4. Such an arrangement will increase the heat absorbing capacity of the evaporator. Any moisture collecting on and dripping off of these interposed fins 11' will drip onto the inclined portion 12 below said fins and thus be drained off by way of the trough 14.

Figure 5:
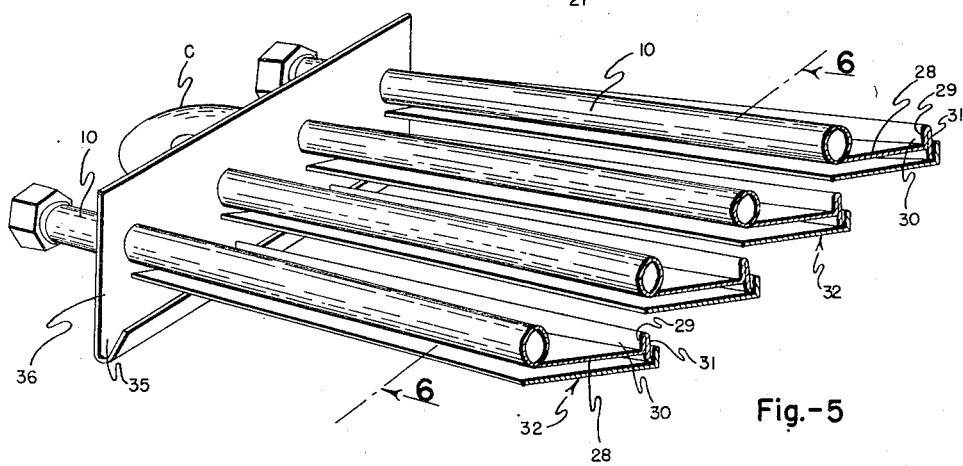
Figure 5 is a perspective view of still another modified construction, shown partly in section, which can be employed either as a combined evaporator and drip catcher, or only as a drip catcher for use beneath an evaporator already installed.
Figure 6:
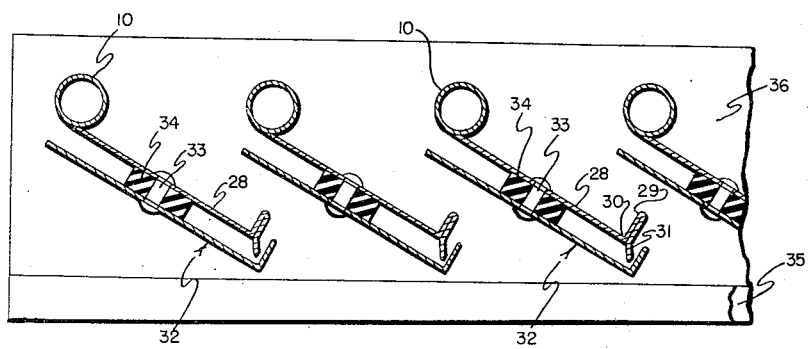
Figure 6 is a sectional view taken on the line 6—6 of Figure 5 showing details of construction.

Figures 5 and 6 show another modified evaporator and drip catcher arrangement with which the drip catchers have direct heat transfer contact with the coil of the evaporator so that defrosting of the evaporator and drip catcher can take place simultaneously whenever hot refrigerant gases are passed through the coil. By referring to Figures 5 and 6 it will be seen that each parallel section of the pipe 10, forming the coil C, has directly attached to the bottom thereof by suitable means, a plate 28 which slopes downwardly away from the pipe. At the lower end of this plate there is an integral upwardly extending portion 29 to form the trough 30. The upwardly extending portion 29 is further extended and turned back on itself so as to provide an extension 31 which is arranged to project into the trough portion of a baffle trough 32 positioned beneath and spaced from the inclined plate 28. This baffle trough 32 is connected to the plate 28 by rivets 33 and spacing is accomplished by associated insulating blocks 34. The inclined plates 28, attached to the bottom of the pipes, are of such width that the trough end thereof is positioned vertically below an adjacent pipe and overlaps the inclined plate which extends from the bottom of an adjacent pipe. Thus, there is a louver-like arrangement which will catch any moisture dripping from the evaporator pipes and the troughs will convey the moisture into a collecting drain-off trough 35 positioned at the like ends of the inclined plates 28. This trough 35 may be formed by a turned up portion as the edge of a plate 36, which is attached directly to the coil by having the pipe extend through holes. The evaporator shown in Figures 5 and 6 is very simple in construction and cheap to manufacture. No fins are provided, yet the coil has associated therewith drip catching means which can be defrosted simultaneously with the defrosting of the coil as, for example, by the circulation of hot gases therethrough.

The structure of Figures 5 and 6 is not only useful as an evaporator of a refrigerating system, but is can be used solely as a drip catcher beneath a previously installed evaporator coil having the usual fin construction. In such case, refrigerant will not be circulated through the coil C, but said coil will be connected so as to have hot gases circulate therethrough whenever hot gases are circulated through the coil of the evaporator with which the structure is associated as a drip catching means. Consequently, whenever the evaporator is defrosted, hot gases will also pass through the coil C in the structure of Figures 5 and 6 and cause defrosting of the drip catcher. Efficient defrosting of the plates 28 of the drip catcher will not only take place, due to the fact that these plates are directly secured to the pipe and in maximum heat exchange relation therewith, but also efficient defrosting or thawing of ice in the baffle trough will be accomplished due to the extension 31 projecting into and closely adjacent the bottom of the baffle trough 32. Thus, this drip catcher will be very efficient as a drip catcher in any room which is to be maintained at a temperature lower than freezing.

In Figure 7 there is disclosed how a drip catcher embodying my invention may be associated with the multiple path plate type of evaporator commercially known as the BTC evaporator plate. This evaporator has a top wall 37 and a bottom wall 38 secured together at their marginal portions. The bottom wall has a grid iron design as indicated to thus provide multiple flow paths for the refrigerant as is well known. To the outer surface of the bottom wall of this evaporator is secured a plurality of tubes 39 of a heat conducting material, said tubes being secured to the wall in any desired manner as for example by welding, soldering or brazing. These tubes may have a coil like the coil C of Figure 5 in order that hot gases or liquid may be circulated therethrough by suitable connections and thereby provide means for rapid defrosting of the evaporator plate.

The drip catcher structure shown as associated with the evaporator in Figure 7 is identical with that shown in Figures 5 and 6 and the parts are indicated by like reference numerals. With the tubes 39 secured to the bottom of the evaporator, the inclined plate 28 can be suitably attached to a tube. The drip catcher structure attached to one tube will overlap a drip catcher structure attached to an adjacent tube to thus establish the louver-like arrangement which will catch any moisture dripping from the evaporator. The troughs will convey the moisture into a suitably positioned collecting drain-off trough (not shown). When the evaporator is defrosted by passing hot gases or liquid through the tubes, the heat will also be conducted to the drip catcher plates to cause defrosting thereof because of the heat exchange relation thereof. The extension 31 will thaw ice in the baffle troughs.

In Figure 8 the evaporator with which the drip catcher is to be associated is of the serpentine type. Here the bottom wall 40 is so trough formed that when secured to the top wall 41 a continuous sinuous-like passage 42 will be provided, in which the refrigerant will flow. To these trough formed parts of the bottom wall the inclined plates 28' of the drip catcher structure will be directly attached as by welding. In making attachment the upper ends 43 of the inclined plates will be shaped to conform with the curvature of the trough formed parts of the bottom wall, thus providing good heat conduction between the evaporator and plates 28'. The lower ends of the inclined plates are formed with troughs in the same manner as the previously described plates 28 and attached to the plates are the baffle troughs 32. One drip catcher structure is arranged to overlap an adjacent drip catcher structure as shown, to thus provide a louver-like arrangement. Moisture dripping from the evaporator will be caught in a manner believed to be obvious. The collected moisture will be conveyed to a collecting drain-off trough (not shown).

If the sinuous like passage 42 of the evaporator is not to be used as in defrosting by passing hot fluid therethrough, separate means can be employed. As shown, electrical heating elements 44 can be attached at the connection of the plate 28' with the bottom wall of the evaporator. If desired these heating elements could be replaced with tubes through which hot gases or liquid can be circulated. When the evaporator is defrosted heat will be readily conducted to the plates 28' because of the heat exchange relationship to also defrost the drip catcher in a manner already described.

My improved combined evaporator and drip catcher has many advantages over the presently used evaporator coil and separately spaced drip catcher because of its compactness, and also because it can be readily defrosted simultaneously with the defrosting of the evaporator. It is also superior to refrigerating systems in which forced air induction coils are employed, as no moving parts are required, such as an electric motor, to drive a blower and, consequently, add heat to the refrigerating room. Because of its simplicity and compactness, it can be easily handled and installed and requires less space adjacent the ceiling of the room. My improved evaporator and drip catcher also makes it possible to efficiently use such structure in freezing rooms where the temperature is below freezing. The arrangement of the drip catcher, so as to permit defrosting thereof whenever the coil is defrosted, allows for the use of a drip catcher in places where only plain coils have been previously used and defrosting of the coil is accomplished by brushing or scraping the frost from the coils. When this evaporator is used, the labor expense of scraping and brushing is entirely eliminated and greater evaporator efficiency is present because the drip catcher acts as a secondary heat absorption surface. As shown by examples, the drip catcher embodying my invention is easily associated with various kinds of evaporators whether coil or plate type.

In the various drip catcher structures disclosed the inclined plates are in certain instances shown as overlapping, whereas in other instances the top marginal portion of an inclined plate is vertically above a trough of an adjacent inclined plate to thus make up the louver-like arrangement. Overlapping has been found to be a preferred arrangement, but not essential, and it is to be understood that the invention is not to be so limited. Any arrangement whereby all drip will be caught and conducted to the troughs is all that is required, along with a good heat exchange relation with the evaporator.

Being aware of the possibility of modification of the structures disclosed without departing from the fundamental principles of the invention, it is intended that the scope of the invention is not to be limited except in accordance with the appended claims.

What is claimed is:

1. In combination with an evaporator of a refrigerating system, of a drip catcher structure comprising a plurality of spaced apart plates extending across beneath the evaporator and connected to the evaporator so as to have a substantial direct heat exchange path therewith through material having good heat conducting characteristics, each of said plates being arranged to slope downwardly and having at its lower marginal portion a turned up edge to provide a trough which will be connected in a continuous manner with a plate length, and said plates and troughs being in such vertical relation as to catch all drip from the evaporator.

2. In a refrigerating apparatus, an evaporator comprising a coil having spaced parallel tube portions, and fins carried in direct heat transfer contact with the tube portions, said fins having integral extensions on their lower part extending laterally in a downwardly sloping direction and being provided at the lower marginal part with an upturned edge forming a drain trough which will be a continuation of the fin surface, said extensions being so positioned and of such width as to be in vertical overlapping relation with a trough of one extension positioned below an adjacent extension.

3. In refrigerating apparatus, an evaporator comprising a tubing in the form of a coil, a drip catcher for said coil comprising fins of heat conducting material attached to the tubing of the coil in heat conducting relation, and means extending in integral relation from the fins and as a continuation of its surface throughout the length thereof forming a drip catching means, said extending means being in vertical overlapping relation and having drain troughs along the lower portion thereof.

4. In a drip catcher structure for association with an evaporator of a refrigerating system, a plate structure having a downward sloping surface and having its lower marginal portion turned upwardly to provide a trough and then turned back on itself and extending below the outer bottom part of the trough, and a baffle trough member positioned in spaced relation below the plate structure with the trough portion thereof below the trough of the plate structure and the extension on the trough of the plate structure extending into and closely adjacent the inner bottom of the trough of the baffle trough member continuously throughout its length.

5. In refrigerating apparatus, an evaporator comprising tubing or like structure having parallel sections to form a coil, a drip catcher for said coil comprising downwardly sloping plates each of which is in direct heat exchange relation with a parallel section of the tubing, said plates being arranged to be in vertical overlapping relation and provided at their lower marginal portions with drain troughs each of which has heat conducting relationship with its plate throughout its length.

6. In a drip catcher for association with an evaporator and comprising a plurality of downwardly sloping plates each having a trough at its bottom and said plates arranged to be in vertical overlapping relation with the troughs sloping toward like ends, a common collecting drain trough associated with the low ends of the drain troughs, and plate means in direct heat conducting relation with the evaporator and having a portion extending downwardly into the inner part of the collecting drain trough to a point closely adjacent its bottom and throughout its length.

7. In combination with a plate type of evaporator of a refrigerating system having passages therein, through which refrigerant flows, of a drip catcher structure comprising a plurality of downwardly sloping plates having their top portions connected to the bottom of the plate evaporator opposite passages so as to be in direct heat exchange relation therewith by way of a path having material of good heat conducting characteristics, said plates being arranged in vertical overlapping relation and provided at their lower marginal portions with drain troughs each of which is throughout its length in direct heat conducting relation with a plate by the said material.

8. In combination with a plate type of evaporator of a refrigerating system having passages therein, through which refrigerant flows, of a drip catcher structure comprising a plurality of downwardly sloping plates having their top portions connected to the bottom of the plate evaporator opposite passages so as to be in direct heat exchange relation therewith by way of a path having material of good heat conducting characteristics, said plates being arranged in vertical overlapping relation and provided at their lower marginal portions with drain troughs each of which throughout its length is connected by the said material with the plate, and means for supplying heat directly to the plate evaporator at the passages and to the plates to thereby accomplish defrosting of the evaporator and the drip catcher structure.

9. In combination with a plate type of evaporator of a refrigerating system having passages therein, through which refrigerant flows, of a drip catcher structure comprising a plurality of downwardly sloping plates having their top portions connected to the bottom of the plate evaporator opposite passages so as to be in direct heat conducting relation therewith by way of a path having material of good heat conducting characteristics, said plates being arranged in vertical overlapping relation and provided at their lower marginal portions with drain troughs, and electrical heating elements carried by the evaporator at the connection of the drip catcher plates therewith for providing heat to accomplish defrosting of both the evaporator and the drip catcher structure.

10. In combination with a refrigerating system, an expansion chamber providing an enclosure for a refrigerant to absorb heat, spaced apart heat conducting fins arranged in direct heat exchange relation with the expansion chamber, the lower portion of said fins extending laterally below the expansion chamber in a downwardly sloping direction, a drip collecting trough arranged along the lower portion of each of the fins and having throughout its length continuous connection with its fins, a baffle trough member positioned beneath each of the drip collecting troughs, said drip collecting troughs and baffle trough members arranged to slope downwardly at like ends, and a trough positioned below and at the lower ends of the said drip collecting troughs and the baffle trough members to receive the drip water collected thereby.

11. In refrigerating apparatus, a fin coil evaporator comprising long and short heat conducting fins arranged in serial relation and connected in direct heat exchange relation with a tubing coil, said long fins arranged to have their lower portions extend laterally below the lower extremities of the short fins in a downwardly sloping direction to provide inclined surfaces to intercept and catch drops of condensate water from the short fins or other portions of the evaporator, and trough means to carry off the caught condensate water.

12. In combination with a finned type refrigeration evaporator, a louver-type drip catching means comprising a series of spaced apart downwardly inclined drip plates to catch the condensate drip from the evaporator and a series of troughs arranged to collect the drip caught by the plates, said drip plates extending downwardly from and supported by fins of the said finned type evaporator with each plate in direct heat exchange relation with a fin.

13. In combination with a finned-type refrigeration evaporator, drip catching means comprising spaced apart downwardly inclined drip plates and spaced apart downwardly inclined troughs arranged to catch and collect condensate drip from the plates, each of said drip plates extending diagonally from and supported in substantial heat exchange relation by an individual fin of the said finned-type evaporator.

14. In combination with a refrigerator evaporator, spaced heat conducting fins therefor provided with integral downwardly extending surfaces inclined to the plane of the fins, and trough means associated with the inclined surfaces to catch condensate dropping on the surfaces, said downwardly extending surfaces and trough means establishing a catching means for all condensate dripping from the evaporator.

15. In a combination refrigeration evaporator and drip catcher, an evaporator comprising refrigerant conduit means and spaced apart heat conducting fins arranged in heat exchange relation with the conduit means, drip catching means comprising spaced apart and downwardly inclined drip plates with troughs arranged along their lower edges, the said heat conducting fins of the evaporator arranged in closer spaced relation than the spaced relation of the inclined drip plates to thereby provide a greater number of heat conducting fins for the absorption of heat than the number of inclined plates required to provide said drip catching means, each of said drip plates being suspended in an integral manner from the lower portions of certain heat conducting fins of the evaporator and arranged to extend below other adjacent fins not provided with plates, and trough means associated with the drip plates to thereby catch condensate.

16. In refrigeration apparatus, a plurality of spaced apart parallel conduits in which heat laden vapor can be conveyed to accomplish defrosting operations, and a plurality of parallel drip plates each of said drip plates extending in the same longitudinal direction as the conduits and each sloping downwardly in the same general direction from the top edge thereof and being provided at its bottom with water conveying troughs extending in a continuous manner, each of said plates being made of good heat conducting material and connected to a conduit by means providing a good heat exchange path from the conduit to the plate, said conduits having such spaced relation and said plates being of such width and having such angle of slope that when the conduits and plates are in assembled relation the lower trough end of one plate will be below and in overlapping relation to the upper end of the next adjacent plate.

17. In refrigeration apparatus, a plurality of spaced apart parallel conduits in which heat laden vapor can be conveyed to accomplish defrosting operations, a plurality of parallel drip plates each of said drip plates extending in the same longitudinal direction as the conduits and each sloping downwardly in the same general direction from the top edge thereof and being provided at its bottom with water conveying troughs extending in a continuous manner, each of said plates being made of good heat conducting material and connected to a conduit by means providing a good heat exchange path from the conduit to the plate, said conduits having such spaced relation and said plates being of such width and having such angle of slope that when the conduits and plates are in assembled relation the lower trough end of one plate will be below and in overlapping relation to the upper end of the next adjacent plate, and means establishing a second trough in spaced relation below each trough of a plate.

RAY M. HENDERSON.

References Cited in the file of this patent

UNITED STATES PATENTS

| Number | Name | Date |
| --- | --- | --- |
| 1,709,730 | Maxwell | Apr. 16, 1929 |
| 1,834,949 | Hull | Dec. 8, 1931 |
| 2,099,165 | Henderson | Nov. 16, 1937 |
| 2,225,678 | Ardito | Dec. 24, 1940 |
| 2,251,649 | Wichmann | Aug. 5, 1941 |
| 2,410,194 | Baker | Oct. 29, 1946 |
| 2,427,200 | Dreier | Sept. 9, 1947 |